US011631338B2

(12) United States Patent
Pu et al.

(10) Patent No.: US 11,631,338 B2
(45) Date of Patent: Apr. 18, 2023

(54) DEEP KNOWLEDGE TRACING WITH TRANSFORMERS

(71) Applicant: ACT, INC., Iowa City, IA (US)

(72) Inventors: Shi Pu, Iowa City, IA (US); Michael Yudelson, Iowa City, IA (US); Lu Ou, Iowa City, IA (US); Yuchi Huang, Iowa City, IA (US)

(73) Assignee: ACT, INC., Iowa City, IA (US)

( * ) Notice: Subject to any disclaimer, the term of this patent is extended or adjusted under 35 U.S.C. 154(b) by 387 days.

(21) Appl. No.: 16/899,433

(22) Filed: Jun. 11, 2020

(65) Prior Publication Data

US 2021/0390873 A1 Dec. 16, 2021

(51) Int. Cl.
G09B 7/04 (2006.01)
G06F 17/16 (2006.01)
G06N 20/00 (2019.01)

(52) U.S. Cl.
CPC ............ *G09B 7/04* (2013.01); *G06F 17/16* (2013.01); *G06N 20/00* (2019.01)

(58) Field of Classification Search
CPC ............ G09B 7/04; G06F 17/16; G06N 20/00
See application file for complete search history.

(56) References Cited

U.S. PATENT DOCUMENTS 10,089,580 B2 * 10/2018 Shan .................. G06F 16/3329
2015/0170536 A1 * 6/2015 Lan ........................ G06N 20/00
434/350

OTHER PUBLICATIONS

Choi et al., "Assessment Modeling: Fundamental Pre-training Tasks for Interactive Educational Systems," arXiv preprint arXiv:2002.05505 (2020), 10 pages.

(Continued)

*Primary Examiner* — James S. McClellan
(74) *Attorney, Agent, or Firm* — Davis Graham & Stubbs LLP

(57) ABSTRACT

Digital learning or tutoring systems as described herein embed, by a trained machine learning knowledge tracing engine, an array for learner interactions X into a static representation $e_j$ corresponding to a prior learner interaction $x_j$ and determine a contextualized interaction representation $h_j$ based on this. Digital tutoring systems described herein calculate, by a masked attention layer of the trained machine learning knowledge tracing engine, an attention weight $A_{ij}$ based on a time gap between two learner interactions with the system, and can calculate a contextualized interaction representation $h_j$, wherein the contextualized interaction representation $h_j$ is proportional to the attention weight $A_{ij}$. The systems can provide for display at the GUI a second question item based on the contextualized interaction representation $h_j$, the second question item corresponding to a recommended learner recommendation.

19 Claims, 7 Drawing Sheets

(56) References Cited

OTHER PUBLICATIONS

Choi et al., "Towards an Appropriate Query, Key, and Value Computation for Knowledge Tracing," arXiv:2002.07033v1 [cs.LG] Feb. 14, 2020, 9 pages.
Dai et al., "Transformer-XL: Attentive Language Models Beyond a Fixed-Length Context," arXiv:1901.02860v3 [cs.LG] Jun. 2, 2019, 20 pages.
Devlin et al., "BERT: Pre-training of Deep Bidirectional Transformers for Language Understanding," arXiv: 1810.04805v2 [cs.CL] May 24, 2019, 16 pages.
Khajah et al., "How Deep is Knowledge Tracing?," arXiv:1604.02416v2 [cs.AI] Jun. 21, 2016, 8 pages.
Nagatani et al., "Augmenting Knowledge Tracing by Considering Forgetting Behavior," WWW'19: Proceedings of the 2019 World Wide Web Conference, San Francisco, CA, USA, May 2019, pp. 3101-3107.
Omote et al., "Dependency-Based Relative Positional Encoding for Transformer NMT," Proceedings of Recent Advances in Natural Language Processing, Varna, Bulgaria, Sep. 2-4, 2019, pp. 854-861.
Pandey et al., "A Self-Attentive model for Knowledge Tracing," arXiv: 1907.06837v1 [cs.LG] Jul. 16, 2019, 6 pages.
Patikom et al., "ASSISTments Longitudinal Data Mining Competition 2017: A Preface," Proceedings of the Workshop on Scientific Findings from the ASSISTments Longitudinal Data Competition, International Conference on Educational Data Mining, 2018, 4 pages.
Piech et al., "Deep Knowledge Tracing," Advances in Neural Information Processing Systems (2015), 9 pages.
Radford, et al., "Language Models are Unsupervised Multitask Learners" OpenAI Blog 1.8 (2019), 24 pages.
Shaw et al., "Self-Attention with Relative Position Representations," arXiv preprint arXiv: 1803.02155 (2018), 5 pages.
Shiv et al., "Novel positional encodings to enable tree-based transformers." Advances in Neural Information Processing Systems, 2019, 11 pages.
Vaswani et al, "Attention Is All You Need," Advances in neural information processing systems, 2017, 11 pages.
Wang et al., "Encoding word order in complex embeddings," arXiv:1912.12333v1 [cs.CL] Dec. 27, 2019, 15 pages.
White, K. Geoffrey, "Forgetting functions," Animal Learnings& Behavior 2001, 29 (3), pp. 193-207.
Zhang et al., "Dynamic Key-Value Memory Networks for Knowledge Tracing," Proceedings of the 26th international conference on World Wde Web. 2017, pp. 765-774.
Zhang et al., "Incorporating Rich Features into Deep Knowledge Tracing," Proceedings of the Fourth (2017) ACM Conference on Learning@ Scale, 2017, pp. 169-172.

* cited by examiner

DEEP KNOWLEDGE TRACING WITH TRANSFORMERS

FIELD

The disclosed technology relates generally to digital knowledge tracing and proficiency estimation for testing.

BACKGROUND

In the context of developing digital tutoring systems or digital learning platforms, knowledge tracing models can track learners understanding of knowledge concepts and predict learner interactions with the digital tutoring system or the digital learning platform.

Digital tutoring and/or digital learning systems can infer students' understanding of knowledge from the at least a portion of a history of student interactions, and rely on evidence across different knowledge components. Unlike current systems, the improved intelligent digital tutoring system further addresses a learner's forgetting behavior by including a trained machine learning model using transformation architecture with a masked attention layer. The masked attention layer can address decay of mastery of skills and/or knowledge. The masked attention layer can be based on an attention weight and can be adjusted by the time gap between interactions with the intelligent tutoring system.

Moreover, current digital tutoring systems or digital learning platforms either use only human labeled item to skill association or only machine learned item to skill association. The former does not tolerate errors or multiple mappings in the item to skills; while the latter discard the rich human expert knowledge on the items and can only learn the item skill association when items are frequently attempted by students. The present disclosure provides a mechanism to combine human expertise and machine found statistical patterns through an interaction mapping layer.

BRIEF SUMMARY

A digital learning or digital tutoring system, can include a graphical user interface (GUI). The digital learning system can include a machine learning based knowledge tracing engine. The machine learning based knowledge tracing engine can include a processor and a non-transitory medium with computer executable instructions embedded thereon.

The computer executable instructions configured to cause the processor to: provide for display at the GUI, a first question item. The processor can also be configured to obtain, by the GUI, an indication of a first learner interaction with the first question item. The processor can be configured to populate an array for learner interactions X with an element comprising the first question item and the first learner interaction. The processor can also map, by an interaction embedding layer operating on the machine learning based knowledge tracing engine, the array for learner interactions into an embedding $e_i$ for the interactions. Mapping the array for learner interactions X can include creating an interaction-skill mapping matrix W, which represents the weight associated with all latent skills for the learner interactions. $W_i$ can be the $i_{th}$ row of interaction-skill mapping matrix W, representing the weight associated with all latent skills the interaction $x_i$. The interaction-skill mapping matrix W can be initialized using skill tags. Interaction-skill mapping matrix W can be initialized using expert assigned skill tags.

Mapping the array for learner interactions X can include creating a skill embedding matrix S which represents the latent skills for each learner interaction. Each column of skill embedding matrix S can be a vector representation of one of the latent skills of the interaction $x_i$.

In some embodiments, for each learner interaction xi in X, a respective question item $q_i$ is tagged with a skill tag array $s_j$, and the interaction-skill mapping matrix W is initialized using the skill tag $s_j$.

In embodiments, when $x_i$ is tagged with skill tag $s_j$, the ith row and jth column of skills of interaction-skill mapping matrix W can be initialized to $$\frac{(1 - \text{smoothing})}{\text{temperature}},$$

and every other skill in the ith row can be initialized to $$\frac{(1 - \text{smoothing})}{(nskills - 1) * (\text{temperature})}.$$

$c_i$ can be 0 or 1, representing whether the response is incorrect or correct. $W_i$ can be the ith row of interaction-skill mapping matrix W, representing the weight associated with all latent skills the interaction $x_i$. $e_i$ can be softmax($W_i$)S. smoothing and temperature can be hyperparameters that control the smoothness of logits passed to the softmax function.

X can include elements $x_i=(q_i, c_i) \cdot q_i$ can represent the first question item or another question item. $c_i$ can represent whether the corresponding response was incorrect or correct in the interaction.

The embedding ei for the interaction can be the product of the normalized Wi and the skill embedding matrix S. $e_i$ can be softmax($W_i$)S.

The processor can also provide for display at the GUI a second question item selected based on the embedding $e_i$ for the interactions, the second question item corresponding to a recommended learner recommendation.

The processor can also operate a transformer comprising a masked attention layer. The processor can further obtain a time stamp for each learner interaction in the array for learner interactions X.

The processer can further calculate, by the masked attention layer, an attention weight $A_{ij}$ based on a time gap between the first learner interaction xj and another learner interaction in the learner interaction array. The time bias $b(\Delta t_{j-i})$ can be used to adjust the attention weight, $A_{ij}$ between interactions $e_j$ and $e_i$.

The processor can extract, by the masked attention layer of the transformation model, query qj corresponding to a first latent skill for static representation of interaction ej. The processor can extract, by the masked attention layer of the transformation model, key kj corresponding to a second latent skill associated with the static representation of interaction ej. The processor can extract, by the masked attention layer of the transformation model, value vj corresponding to the state of the latent skill associated with the static representation of interaction ej, $q_j$ can be $Qe_j \cdot k_j$ can be $Ke_j \cdot v_j$ can be $Ve_j \cdot Q$, K, and V can be trainable vectors.

The processor can determine the attention weight $A_{ij}$ to be proportional to $q_j k_i + b(\Delta t_{j-i}) \cdot q_j k_i$ can be a query-key agreement between interactions $e_j$ and $e_i$.

For attention weight $A_{ij}$, $A_{ij}$ can be $$\frac{q_j k_i + b(\Delta t_{j-i})}{\sqrt{d_k}} \cdot b(\Delta t_{j-i})$$

can be $uK^*(f(g(\Delta t_{j-i}))) \cdot \Delta t_{j-i}$ can be $t_j - t_i$, corresponding to the time gap between inputs $x_j$ and $x_i \cdot g(x)$ can be a negative exponential function, such that $g(x) = e^{-\lambda x}$. $f(x)$ can be a sinusoidal positional embedding function. $f(x)$ can correspond to a forgetting behavior of a learner. u can be a learned vector and can be routinely updated. $\sqrt{d_k}$ can normalize an attention magnitude. $K^*$ can be a trainable key matrix derived from the trainable vector K by applying the transformer model.

Attention weight can be based on a time gap between the pair of learner interactions and an overlap of latent skills between corresponding question items for the learner interactions. For example, the attention weight can be higher when the two corresponding question items have a first overlap in latent skills, than when the two corresponding question items have a second overlap in latent skills smaller than the first overlap. the attention weight is based on an overlap between a first latent skill corresponding to the first learner interaction xj; and a second latent skill corresponding to a second interaction in the learner interaction array X. attention weight between the first learner interaction and the other learner interaction is higher when the interactions have a large overlap in latent skills, than when the two interactions have little overlap in latent skills, or when the two interactions have the same overlap in latent skills and the time gap between the two learner interactions is larger.

The processor can calculate a contextualized interaction representation $h_j$. The contextualized interaction representation $h_j$ can be proportional to attention weight $A_{ij}$. The contextualized representation $h_j$ can be a weighted sum product normalized attention weights times value $v_i$. $h_j$ can be $\Sigma_{i \leq j}$ softmax$(A_{ij}) v_i$.

The system can provide for display at the GUI a second question item based on the contextualized interaction representation $h_j$, the second question item corresponding to a recommended learner recommendation. The system can predict the learner's response to the second question item based on the contextualized interaction representation $h_j$. The system can also provide for display at the GUI a knowledge mastery level for the learner based on the contextualized interaction representation $h_j$.

BRIEF DESCRIPTION OF FIGURES

The present disclosure, in accordance with one or more various embodiments, is described in detail with reference to the following figures. The drawings are provided for purposes of illustration only and merely depict typical or example embodiments. These drawings are provided to facilitate the reader's understanding of various embodiments and shall not be considered limiting of the breadth, scope, or applicability of the present disclosure. It should be noted that for clarity and ease of illustration these drawings are not necessarily made to scale.

DETAILED DESCRIPTION

The present disclosure provides systems and methods for improved intelligent digital tutoring having a trained machine learning engine using an interaction mapping layer and transformation architecture with a masked attention layer.

Figure 1A:
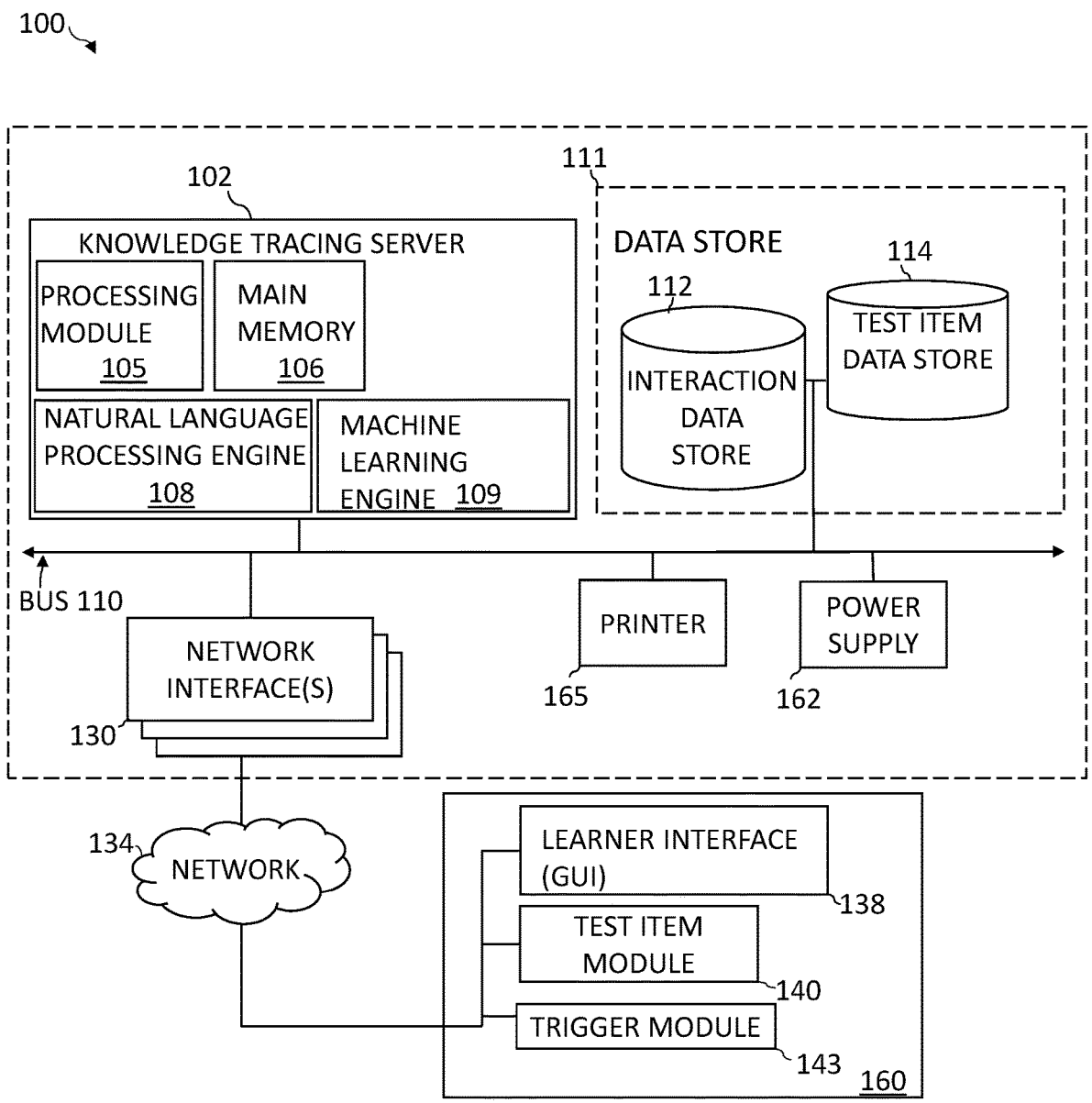
FIG. 1A illustrates a diagram of computing system for digital knowledge tracing, in accordance with embodiments disclosed herein.

FIG. 1A illustrates an example system 100 for improved intelligent digital tutoring, digital learning, and/or adaptive testing. The improved digital tutoring system 100 can be used to tutor and/or test a learner's grasp of knowledge concepts. The system 100 can be used for tracking a learner's understanding of knowledge concepts and predicting learner interactions with the system 100.

The system 100 can include a knowledge tracing server 102. The knowledge tracing server 102 can include a processing module 105. The processing module 105 may represent, for example, computing or processing capabilities found within desktop, laptop and notebook computers; hand-held computing devices (PDA's, smart phones, cell phones, palmtops, etc.); mainframes, supercomputers, workstations or servers; or any other type of computing devices as may be desirable or appropriate for this application or environment. The processing module 105 can also represent computing capabilities embedded within or otherwise available to a given device. For example, a computing engine might be found in other electronic devices such as, for example, digital cameras, navigation systems, cellular telephones, portable computing devices, modems, routers, WAPs, terminals and other electronic devices that might include some form of processing capability. The processing module 105 can be implemented using, for example, a microprocessor, controller, or other control logic.

The knowledge tracing server 102 can further include a natural language and processing (NLP) engine 108 and/or a prediction and/or machine learning evaluation engine 109. The NLP engine 108 and/or machine learning evaluation engine 109 can include commands stored in main memory 106 (and/or the knowledge tracing server 102) and executed by the processing module 105 (and/or the knowledge tracing server 102). Commands stored in main memory 106 (and/or the knowledge tracing server 102) can be executed by the processing module 105 (and/or the knowledge tracing server 102).

The NLP engine 108 can perform detection and recognition of semantic and linguistic properties of language. For example, from a test item and/or tokenized test item, the NLP engine can use statistical models, such as word frequency, word collocations and co-occurrences, term frequency-inverse document frequency, and/or rapid automatic keyword extraction to extract key words from the test item. The processing module 105, and/or the engines 108, 109, can operate a machine learning based item evaluation model.

The system 100 can further include a data bus 110, although any communication medium can be used to facilitate interaction with other components of the system 100 or to communicate externally.

The system 100 for improved intelligent digital tutoring can include a data store 111. Data associated with one or more operations of the present disclosure may be stored in the data store 111. The data store 111 may be a local or a remote data store 111 (or a combination thereof) and may additionally be configured to receive and/or forward some or all of the stored data relating to an operation of the present disclosure. Data in the data store 111 may be organized as database items. Data store 111 can include an interaction data store 112. The interaction data store 112 data store can include data on one or more learner's current, past, and/or expected future interactions with the system 100.

Data store 111 can include a test item data store 114. Test item data store 114 may include (but not be limited to) previously developed content (i.e. past test items, such as passage items, question items, and/or corresponding answer items), but is not limited to items or other content which have been previously tested or developed. The test item data store 114 can include passages, question(s) (item "stem(s)"), answer(s), multiple choice answers (including correct and/or wrong or distractor answers).

Data store 111 can further include word relationship data store 116. Word relationship data store 116 may include a relationship tree, bucket and/or double bucket data structure. Word relationship data store 116 can include textual patterns, such as skill-specific language cues (for example as search strings). For example, textual patterns that allow for understanding comparative relationships can be search strings "is greater than" or "is like". Word relationship data store 116 can include one or more definitions, associated words, associated skills, etc. for the textual patterns and/or words.

The data store 111 may take one or more of various forms, which might include, for example, a media drive and a storage unit interface. The media drive might include a drive or other mechanism to support fixed or removable storage media. For example, a hard disk drive, a floppy disk drive, a magnetic tape drive, an optical disk drive, a CD or DVD drive (R or RW), or other removable or fixed media drive might be provided. Accordingly, storage media might include, for example, a hard disk, a floppy disk, magnetic tape, cartridge, optical disk, a CD or DVD, or other fixed or removable medium that is read by, written to or accessed by media drive 912. As these examples illustrate, the storage media can include a computer usable storage medium having stored therein computer software (including for executing instructions for the item evaluation server 102) or data.

In alternative embodiments, data store 111 might include other similar instrumentalities for allowing computer programs or other instructions or data to be loaded into the knowledge tracing server 102 and/or the processing module 105. Such instrumentalities might include, for example, a fixed or removable storage unit and an interface (e.g. the reviewer interface 138). Examples of such storage units and interfaces can include a program cartridge and cartridge interface, a removable memory (for example, a flash memory or other removable memory engine) and memory slot, a PCMCIA slot and card, and other fixed or removable storage units and interfaces that allow software and data to be transferred from the data store 111 to the knowledge tracing server 102.

Knowledge tracing server 102 might also include one or more memory engines, simply referred to herein as main memory 106. For example, preferably random access memory (RAM) or other dynamic memory, might be used for storing information and instructions to be executed by processing module 105. Main memory 106 might also be used for storing temporary variables or other intermediate information during execution of instructions to be executed by processing module 105. Knowledge tracing server 102 might likewise include a read only memory ("ROM") or other static storage device coupled to bus 110 for storing static information and instructions for processing module 105. Such memory may be part of data store 111. In some embodiments of the disclosure, the knowledge tracing server 102 may be configured to execute any one or more of the protocols, processes, models, or operations of this disclosure, provide outputs for display on the electronic device 160 and/or the learner graphical user interface (GUI) 138, and receive inputs from the electronic device 160 and/or the data store 111. In various other embodiments, the knowledge tracing server 102 may be configured to execute any one or more operations associated with digital tutoring, knowledge tracing, and/or digital assessment test items, such as receiving, transmitting, tracking, storing, developing, and/or administering multiple choice and other assessment test items, from paper material (e.g. via a scanner for scanning textual content, not shown), or cooperatively with one or more other electronic devices 160, computers, or workstations.

Network interface(s) 130 can facilitate communication with electronic device(s) 160 on external and/or internal network 134 and the other components of the system 100. Network interface(s) 130 can be used to allow software and/or data to be transferred between the knowledge tracing server 102 and/or the data store 111, and/or one or more device(s) 160. Examples of network interface(s) 130 might include a modem or softmodem, a standardized wired or wireless network interface (such as an Ethernet, network interface card, WiMedia, IEEE 802.XX or other interface), a communications port (such as for example, a USB port, IR port, RS232 port Bluetooth® interface, or other port), or other communications interface. Software and/or data transferred via network interface 130 might typically be carried on signals, which can be electronic, electromagnetic (which includes optical) or other signals capable of being exchanged by a given network interface 130. These signals might be provided to network interface 130 via the bus 110. The bus 110 might carry signals and might be implemented using a wired or wireless communication medium. Some examples of a bus 110 might include a phone line, a cellular link, an RF link, an optical link, a network interface, a local or wide area network, and other wired or wireless communications channels. The network 134 may be the internet, a public switchable telephone network, a local area network, private wide area network, wireless network, or any of the like for communicating with the system 100 and or the device(s) 160 of the present disclosure. Although a network 134 is shown, it is understood that the disclosure is not limited to operation with a network, but rather, the disclosure may be practiced in any suitable electronic device (or multiple devices). For example, device(s) 160 can be part of the system 100, coupled to bus 110, without coupling to the network 134. Accordingly, network 134 is not meant to limit the disclosure in any respect.

Learner interface 138 can be a graphical user interface (GUI), and can facilitate providing for display assessment test items. Learner interface 138 can facilitate receiving answers to question items and other user feedback indications, as well as displaying information to the learner/user. A test item module 140 can facilitate receiving and/or displaying test items (or portions thereof, such as passages, questions, and/or answer items) containing text. Previously developed content in the test item data store 114 may be updated with the item(s) (or portions thereof) in the passage module 140. Trigger module 143 can facilitate receiving and/or producing triggers and/or indications from/to the reviewer/user of the system 100, or between other systems and/or other remote device(s) 160. The reviewer interface 138, test item module 140, and/or trigger module 143, may be part of device(s) 160. Device 160 can be a phone, computer, terminal, and/or other system 100.

The system 100 may further include power supply 162. Additionally, a printer 165 and/or scanner may be configured to output the content from one or more operations of the disclosure, including knowledge mastery, metadata, test items, and/or portions thereof, annotated test items, etc.

The one or more engines 108, 109 described herein, and/or the knowledge tracing server 102 can query, reference, address, or otherwise make changes (additions, alterations, additions) to data in the one or more data stores 111 main memory 106, and/or data on or from a device 160.

Figure 1B:
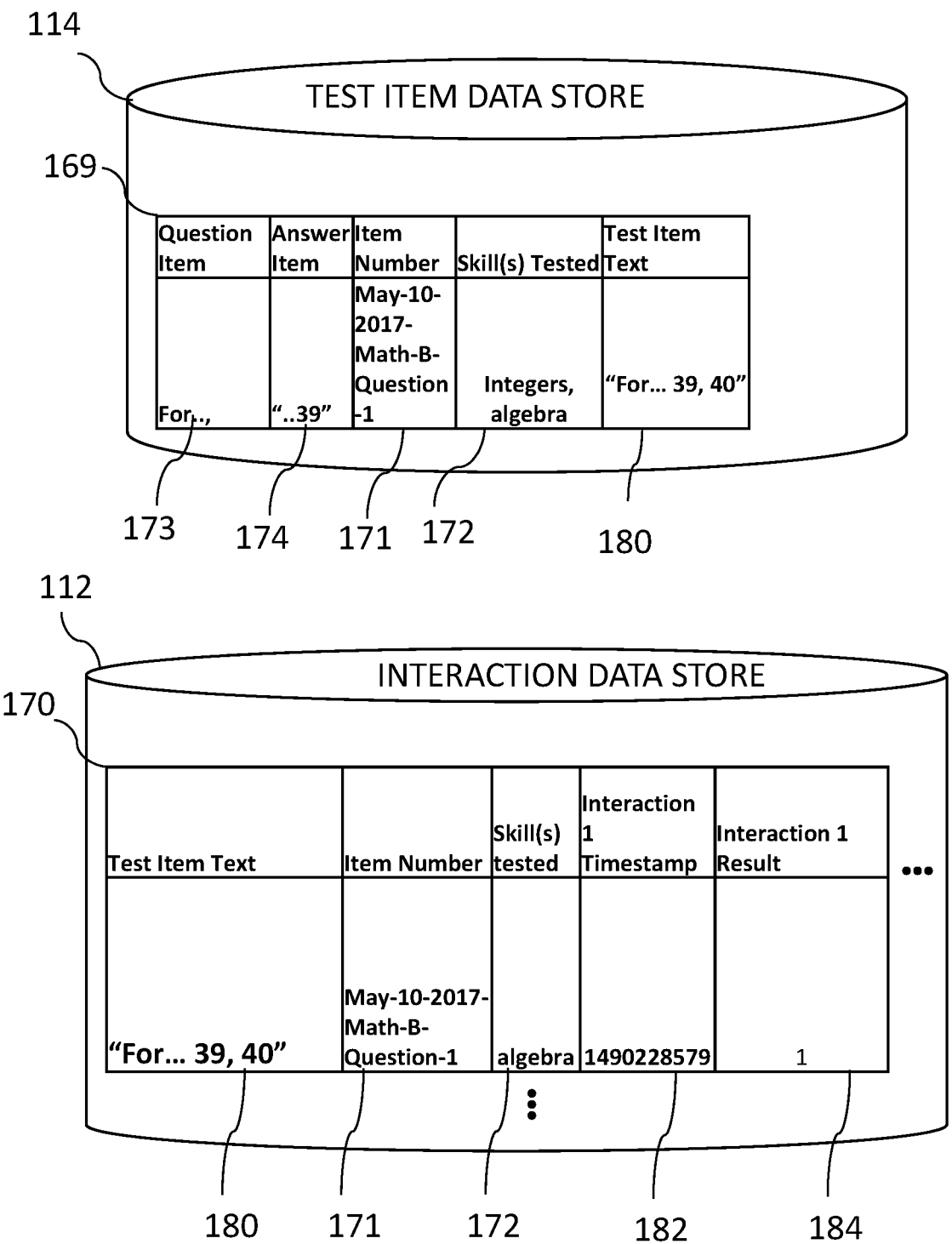
FIG. 1B illustrates example data store entries for digital knowledge tracing in accordance with embodiments disclosed herein.

FIG. 1B shows example database entries for the system 100. For example, test item data store 114 can have database structure 169 and database entries corresponding to question item 173, answer item 174, item number 171, skill(s) tested 172, and/or the full or partial text (e.g. the passage, the question prompt, figures, answers, and/or other data type) of the test item 180. The item number 171 can be a unique identifier for the test item 180. The item number 171 can identify each variation of the test item text 180 (i.e. a test item adapted for testing a specific skill, and/or adapted for a different learner profile can have a different item number).

The test item database structure 169 can have one or more attributes and/or coded metadata that can correspond to each test item. The attribute can be, for example, a testing standard level for the test item, a hint that can be a leading statement to suggest the correct answer, a cognitive load and/or cognitive complexity of the test item, an item discrimination, a theme of the test item, one or more skill 172 tested, item difficulty, and/or a peer-review value for the corresponding test item. The attributes can have an attribute level (e.g. for a cognitive complexity attribute, a cognitive complexity level). The attributes can be manually assigned, and/or coded by the system 100 (e.g. by NLP engine 108 and/or machine learning engine 109). For example, the skill tested 172 can be a human labeled item to skill association and/or a machine learned item to skill association. Systems 100 and methods as described herein are flexible and/or tolerant to errors and/or multiple mappings (assigning, tagging, database entries, etc.) of such attributes.

For example, math test items can be written to test three general levels of cognitive complexity: basic skills, application, and analysis. A basic skills item can be solved by performing a sequence of basic operations. An application item involves applying sequences of basic operations to novel settings or in complex ways. An analysis item requires demonstration of a conceptual understanding of the principles and relationships relevant to particular mathematical operations. Methods and systems as described herein can distinguish between varying levels for cognitive complexity, skills, and/or knowledge mastery required for test items, but also varying levels or degrees for other attributes of test items. Methods and systems described herein can trace knowledge acquisition and/or mastery of varying types and/or levels of skills, cognitive complexity, and/or other attributes of test items, whether these are manually or automatically (by computing systems) tagged or assigned. In accordance with the present disclosure, the type of attribute can be included as an entry to the database structure 169, but also the level or degree of conformity to such attribute can be included.

The test item data store 114 can include one or more textual patterns and/or key words of the test item. In embodiments, key words include words deemed important, and/or relevant, for example by applying natural language processing techniques (e.g. keyword extraction) by the NLP engine 108, and or by using the machine learning evaluation engine 109.

The database structure 169 can also reference items from other data stores, such as database structure 170 corresponding to interaction data store 112. The database structure 169 can include the date the test item was last tested, (and/or the date it was first tested). The database structure can include the source for the test item, the creator, and/or the number of times it was tested. The database structure 169 can include the date the test item was developed and/or peer reviewed. The database structure 169 can include the name and/or device id for the individual, entity and/or computing system that manually and/or automatically developed, peer reviewed, and/or coded metadata for the test item (e.g. tagged the relevant skills 172). The database structure 169 can also include a theme of the test item, skill (type and/or level), the number of times tested, a discriminator (e.g. how many students get that questions right or wrong), and/or an indication of how well adapted the test item is to test the intended skill or attribute the test item is.

As an illustration of example database entries 169, there can be a test item with item number 171 "MAY-10-2017-Math-B-Question-1" having test Item text 180: "For . . . 39, 40" (shortened for brevity).

One or more skill 172 entry in the database can correspond to a broad or specific skill tested, such as broadly math, and/or more specifically geometry, and/or even more specifically coordinate geometry, etc. As another example, the broad skill can be math, with a more specific skill tested being integer algebra tested by word problems. Methods and systems as described herein can allow for knowledge tracing for test items with more than one type of associated skill, and/or with complex hierarchical taxonomy of skill(s).

The database structure 170 for the interaction data store 112 can include data concerning one or more user and/or learner's interactions with the system 100. The database structure 180 can include the name of the user (i.e. individual, entity, learner, student, teacher, id, device number, etc.) that is using, previously used, or will use and/or interact with the system 100. The database structure 170 for the interaction data store 112 can include the test item text 180 (portion thereof, and/or other data type), corresponding item number 171, skill(s) tests 172 (and/or other relevant attribute and/or coded metadata for the test item), and/or corresponding knowledge concept (and/or mastery thereof by the user). The database structure 170 can have data corresponding to specific learner interactions, such as a timestamp 182, interaction result 184, time spent during the interaction, and/or knowledge mastery level before and/or after the specific interaction. The timestamp 182 can be in ISO 8601, UNIX, or other standard format. The time stamp can be a time from the first learner interaction in a sequence of interactions, or a time from the prior interaction (e.g. a time delta). The timestamp can be securely timestamped (e.g. decentralized trusted timestamp, cryptographically secure, public and/or private key signed, or other secure/trusted timestamp).

The interaction result can be a zero or 1 corresponding to if the question was answered correctly or not (for example by comparing the learner's selected answer to a correct answer which can be in the test item data store 114). The interaction result can be a letter, number, and/or percentage (i.e. a percentage compared to a perfect score) grade. The interaction result can be one of two or more levels (e.g. two or more, three or more, four or more, five or more, ten or more, etc.). The interaction result can also depend on the time spent answering the question during the interaction. For example, an interaction which was longer in time (or shorter in time) than an ideal interaction time yet had the correct answer, can have a different interaction result (e.g. a lower percentage score). The learner's responses can be automatically (e.g. by the system 100) and/or manually (e.g. by a grader) scored. In embodiments where questions require short form or long form answers (as compared to multiple choice answers), NLP engine 108 and/or machine learning engine 109 can be used to score the learner's responses (e.g. as compared to a rubric). The database structure 170 can include an interaction id, session id, Bates number, or other identification for the learner interaction and/or of a group of interactions in a sequence of interactions.

These entries can be cross-referenced as data entries of other data stores of the data store 111, for example the attribute 183 in the test item data store 114. New entries can be created in the various data stores of the data store 111 as the system 100 learns and/or develops new content, and/or as textual patterns, attributes, metadata, etc., and as the system assigns and/or reassigns skills as the learner completes subsequent interactions with the system. Respective database entries can be updated routinely and/or automatically (i.e. prompted by some update procedure. Database entries can be updated with each learner's interaction with the system. Anonymized data from one or more learner can be used to calibrate and/or update parameters of the system 100, such as parameters for knowledge tracing.

Although only two database structures which refer to each other are shown in FIG. 1B, other databases in the data store 111 can refer to each other to at least facilitate improved knowledge tracing and/or test item suggestion. The knowledge tracing server 102 can query, reference, address, or otherwise make changes (additions, alterations, additions) to data in the one or more data stores 111 main memory 106, and/or data on or from a device 160. In systems 100, database structures and references to entries thereof can automatically update, thus improving the computationally efficient knowledge tracing and rendering of the GUI(s) for test item and/or knowledge mastery display. In systems 100, entries in the data store 111 may be automatically updated, for example, via the network 134, with real time data from testing (such as test results, question difficulty, question discrimination, or new item generation).

Figure 1C:
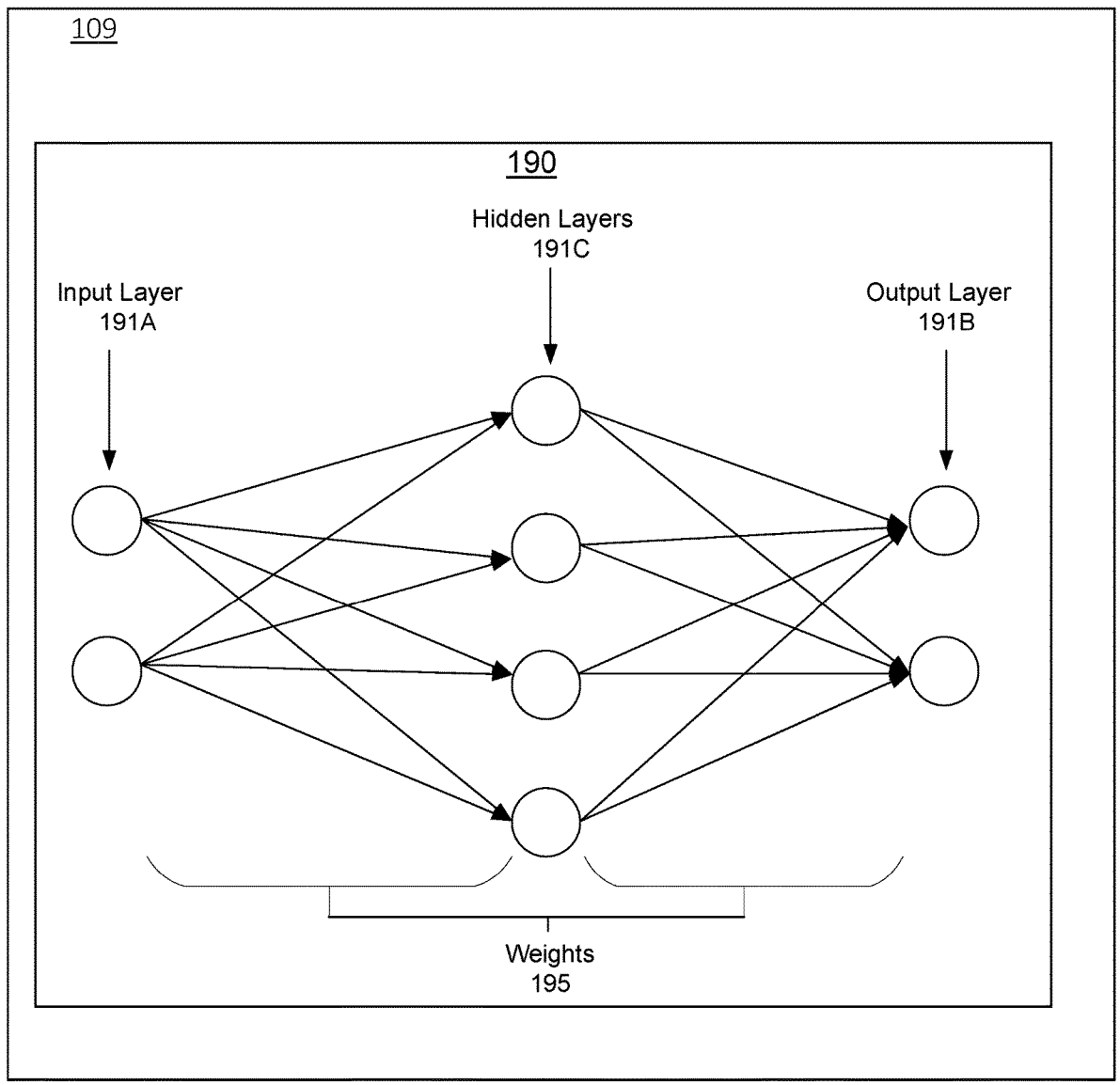
FIG. 1C illustrates a diagram of a machine learning engine, in accordance with embodiments disclosed herein.

FIG. 1C illustrates a diagram of a machine learning model 190 which can operate on machine learning engine 109. In embodiments, machine learning model 190 may comprise a neural network (or portion thereof) that receives and produces output that comprises a classification or statistical prediction. In embodiments, machine learning model 190 can include a recurrent neural network, convolution neural network, feed-forward neural network, etc. In embodiments, model 190 can include a deep knowledge tracing model. In some embodiments, classification or statistical prediction may one or more node corresponding to a learner's knowledge state and/or interaction response to test item(s). The neural network may comprise one or more input layers 191A, one or more output layers 191B, one or more hidden layers 191C, and weights 195 that connect the different layers of the neural network. The nodes in the neural network may correspond with an activation function that can be utilized to determine an output of the node given one or more inputs. The neural network may be used to determine the probability of one or more attributes and/or attribute levels given one or more inputs.

The inputs to machine learning model 190 can include one or more data corresponding to test items, and/or learner interactions with test items. The inputs to machine learning model 190 can include sequence tuples $x_i=(q_i, c_i)$ corresponding to learner interactions with the system. For example, $q_i$ can represent a question item (or test item), and $c_i$ can represent whether the corresponding response was incorrect or correct in the interaction. The inputs to one portion of machine learning model 190 can be outputs of another portion. Some portions of machine learning model 190 may receive certain inputs, while others do not receive those inputs. The input(s) to machine learning model 190 can also include the time stamps for the learner interactions, the test item, attributes for the test item (such as skills tested). Inputs to the machine learning model 190 can be derived from the database 111 of the system. In some embodiments, the machine learning model 190 may be a single-layer neural network comprising an input layer 191A and output layer 191B. In some embodiments, the machine learning model 190 can have multiple groups of layers, with each group of layers having two or more layers, and/or independent (e.g. derived independently from the model 190), and/or cascaded (e.g. derived from another portion of the model 190) inputs and/or outputs. Machine learning model 190 can have parallel and/or series layers or groups of layers.

In some embodiments, forward propagation may be utilized to determine an output corresponding to the probability of one or more node mappings (i.e. item-skill mappings knowledge mappings as described herein). In certain embodiments, forward propagation may be implemented by providing an neural network with one or more inputs, such as interaction related data, and performing a dot product operation between input values and one or more associated weights. The result of the dot product operation may be provided as input to an activation function. In a certain embodiments, the activation function may be a sigmoid function. The resulting numerical value may be comparing to an actual output value to determine an error in the neural network prediction. In embodiments, one or more of the weights utilized by the neural network may be changed to minimize the error. For example, a method such as back-propagation may be implemented to determine a gradient to calculate the optimal weights to minimize error in a neural network.

In some embodiments, input layer 191A may comprise nodes that bring the input data into the machine learning model 190 for further processing by subsequent layers of artificial neurons. In some embodiments, input layer 191A may process and propagate input data forward throughout the neural network. Input layer 191A may also receive information about modifying the connected weights and biases with backpropagation through the one or more hidden layers 191C.

In some embodiments, input(s) to input layer 191A may comprise one or more features. Text featurization techniques (bag of words, bag of n-grams, term frequency, inverse document frequency, etc.) applied to the test item, the learner interaction (e.g. an answer provided by a learner to the system), a user interaction array, test item array can be used to generate features. A feature can be an individual measurable characteristic. In some embodiments, features may be numeric or structural features, such as arrays, strings, and/or graphs which can be used in syntactic pattern recognition. For example, input data may be features in the form of characteristics extracted from data processing, text processing and words, sentences and phrases of a test item, and/or from a trigger and/or indication from devices 160. Features are used in the context of explanatory variables, which can be used in statistical techniques such as linear regression. Explanatory variables are a type of independent variable that can be used to explain the change of an output variable. For example, the words in a sentence may be the explanatory variables for the output variable of a keyword. Features can be based on the test item and/or the learner's interactions.

In some embodiments, hidden layer(s) 191C may comprise nodes that receive and input data from the input layer 191A, process the data, and send it to another hidden layer (not shown in FIG. 1C) or output layer 191B. A hidden layer in an artificial neural network can be a layer in between input layers and output layers, where artificial neurons take in a set of weighted inputs and produce an output through an activation function. In some embodiments, there may be one hidden layer that connects the input layer to an output layer. In some embodiments, there may be multiple hidden layers wherein the leftmost hidden layer is connected to the input layer and the rightmost hidden layer is connected to the output layer. In some embodiments, hidden layer 191C may process and propagate input data forward throughout the neural network. Hidden layer 191C may also receive information about modifying the connected weights and biases with backpropagation through the output layer or other hidden layers.

In some embodiments, output layer 191B may comprise a set of nodes that receive input data from the right-most layer of hidden layer(s) 191C, process the data, and output a classification or prediction. The output layer on an artificial neural network can be the layer utilized to determine the loss or error of the network. The output layer 191B may propagate the error or loss to the hidden layer through backpropagation. One or more weights, biases, and/or mappings can be updated based on the loss or error.

In some embodiments, the output layer 191B may output a classification or set of one or more predictions based on the computation executed throughout the neural network, including a prediction of a input node corresponding with at least one test item, to a prediction of an output node corresponding with at least one skill mapping the test item, knowledge trace, user interaction with the test item, and/or learner profile. For example, the output of a neural network may be predicted learner interaction, a predicted result for a learner interaction, and/or a predicted learner knowledge mastery for one or more knowledge component, knowledge concept, or skill.

The neural network may be implemented by statistical analysis logical circuit than can be part of machine learning engine 109, NLP engine 108, and/or item evaluation server 102. The different layers may be connected by weights and biases that are used to quantify different values in the neural network. Each connection can always has a weight value associated with it. Weights can represent the strength of a connection between nodes (or neurons) of different layers in a neural network. Bias terms can be additional constants attached to neurons and added to the weighted input before the activation function is applied. The training may include updating the weight value to decrease the loss or error of the network. In some embodiments, weights and biases are updated through the backpropagation process from the error or loss calculated in the output layer propagated back through the network.

Thus, with reference to FIGS. 1B and 1C, methods and system 100 described herein can use NLP engine 108 and/or machine learning engine 109 for knowledge tracing, for example by identifying learner interaction outcomes, learner profiles, and/or knowledge mastery. The identification of tagged skills, test item attributes, etc. (item-skill mapping) in cross-referenced databases can increase computing efficiencies and/or product robust inputs for machine learning model 190 operating on machine learning engine 109, when the system 100 determines learner interaction outcomes, learner profiles, and/or knowledge mastery.

Figure 2A:
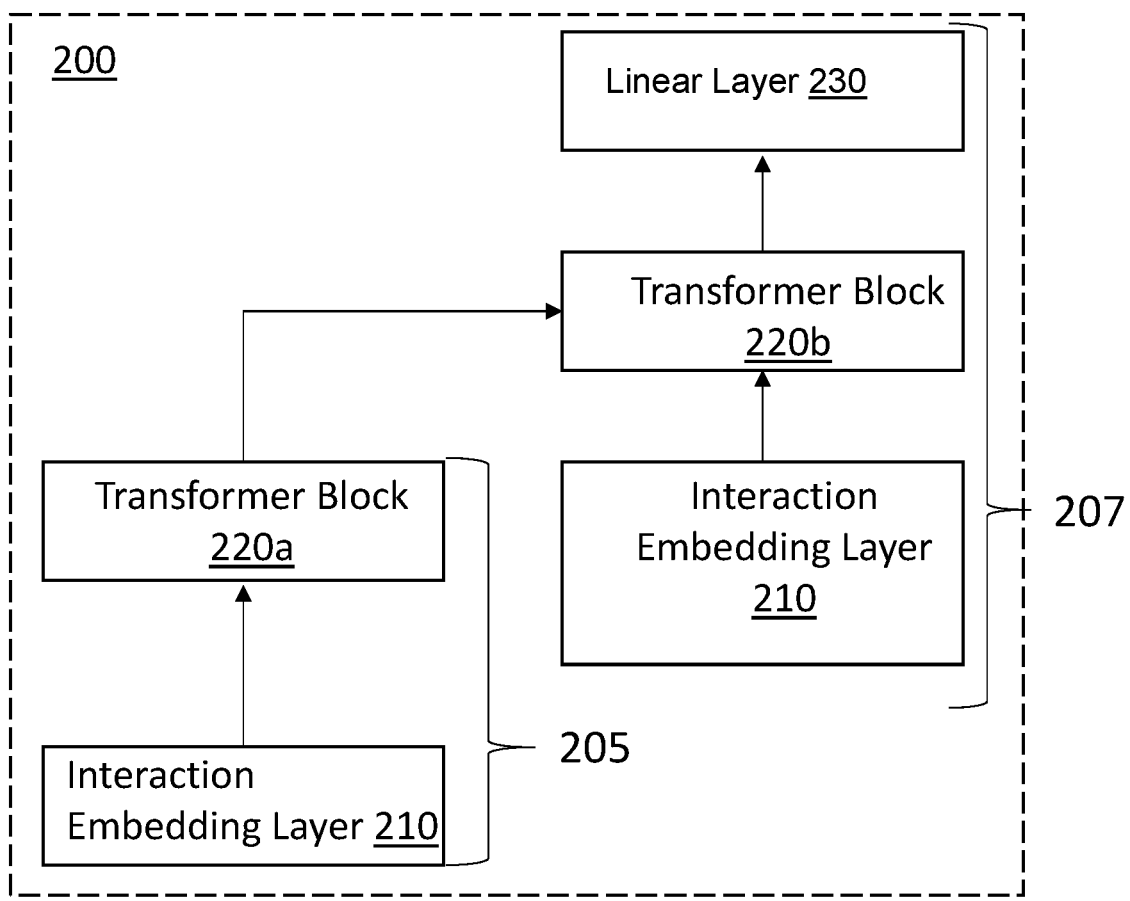
FIG. 2A illustrates a diagram of a machine learning based knowledge tracing model operating on the knowledge tracing server.

FIG. 2A illustrates a diagram of a machine learning based knowledge tracing model 200 operating on the knowledge tracing server 102, i.e. machine learning engine 109.

The model 200 can allow for the system 100 to learn the representations of learner interactions with the system 100. The model 220 can keep track and/or predict a learner's knowledge state and/or interaction response to test item(s). The model 200 can be used to produce a sequence of correctness estimates, $c_{i+1}$, representing whether a student correctly solved the next question $q_{i+1}$. The model 200 can be used to predict a learner's performance on a future test item, problem step, and/or question item. The model 200 can predict a probability for the correctness estimates, $P(c_{i+1}=1|x_0, \ldots, x_0, t_0, \ldots, t_i, q_{i+1})$ The model 200 can be used to access test items for a specific learner, and/or adaptively assign test items to learners.

The model 200 can follow an encoder 205 decoder 207 structure and can have one or more layers (for example node layers as described with reference to FIG. 1C). At least one input to the model 200 can be input to interaction embedding layer 210.

Interaction Embedding Layer

The interaction embedding layer 210 can learn the static representation of each interaction, e.g. as represented by an array of learner interactions. The array of learner interactions can be a static representation of question and answer combinations for interactions with the system 100. The question can be represented by a question id, test id, or other identifier. for example as identified in test item data store 114.

The interaction embedding layer 210 can be responsible for mapping student interaction(s) (e.g. an array of learner interactions X) into a static representation corresponding to a high dimensional vector (e.g. $e_i$). The array of learner interactions can be array for learner interactions, X. The array for learner interactions can keep track of all attempts to questions, abandoned attempts to answer questions, and/or final attempts to answer questions. The array of learner interactions can include all steps of problems and corresponding results, or can concatenate steps into single question—result pairs. The array for learner interactions can include sequence tuples $x_i=(q_i, c_i)$. For example, $q_i$ can represent a question item (or test item) the learner attempted to answer or a problem the learner was trying to solve. $c_i$ can represent whether the corresponding response was incorrect or correct in the interaction. In embodiments the question item and it's correct answer item or interaction, without the result of the student interaction, can be included and coded as $(q_j, 1)$ so that the question and it's correct answer/interaction pair can share the same embedding.

The array of learner interactions can be embedded by the interaction embedding layer 210. For example, a learner's shifted interactions sequence (i.e. a sequence of all previous interactions), e.g., $(x_0, x_1, \ldots, x_{i-1})$, can be embedded as $(e_0, e_1, \ldots, e_{i-1})$ by the interaction embedding layer 210. Thus, shifted embedding sequence for $e_i$, $(e_0, e_1, \ldots, e_{i-1})$ can be an output of interaction embedding layer 210.

The interaction embedding layer 210 can map student interactions, e.g. $x_i=(q_i, c_i)$, or just questions $q_i$, to a static representation, e.g. high dimensional vector $e_i$. The interaction embedding layer 210 can create an interaction-skill embedding matrix W and skill embedding matrix S.

In computing the embedding for the interaction $x_i$, $e_i$, $W_i$ can be the $i_{th}$ row of W, representing the weight associated with all latent skills for the interaction $x_i$. W and/or S can be populated depending on the hierarchical structure of latent skills. The model 200 can map how a question (and answer) is mapped to the skills. An expert assigned (and/or machine assigned) skill can at least partially initialize the matrix. Initialization can be random or quasi-random. This matrix can be updated (thus is trainable). For question/skill mappings which are used once in a sequence, it is likely the system will retain the initialized matrix. For question-skill mappings which are repeated in an interaction sequence, the trainable model will likely update the matrix.

Further the model 200 can represent the skill S as a vector. S can be initialized randomly. The model 200 can modify these two matrix representations to get a representation of a question. W and/or S can be populated to prioritize some skills in hierarchical structure, expert engineered structure, and/or other complex structure of latent skills or of extracted features such as skill taxonomy. For example, for mastery of a knowledge component, many skills may need to be mastered with a specific hierarchy. The model can put emphasis on a fundamental skill which needs to be mastered first before mastery of a second, less basic skill. Such a model can regard an interaction showing a mastery of a less basic skill without a mastery of a more fundamental skill as a false positive (i.e. a guess).

The softmax( ) function can normalize. Each column of S can be a vector representation of the latent skill(s). The latent skill can correspond to one or more skills that have been assigned to the test item, or question $q_i$, for example as represented in test item data store 114. So, the static representation of interaction $x_i$ is a weighted sum of all underlying latent skills.

In embodiments, W can be 2N×M matrix, where N is the number of items, and M is the number of skills. W can have 2N number of rows, because each item corresponds to 2 interactions: (item, 0) and (item, 1). In embodiments where items can have three possible results, W, can have 3N rows. It is understood the number of rows of W can relate to the number of possible interaction outcomes, and the number of columns can relate to the number of associated skills. Rows and columns can also be interchangeable throughout (e.g. inverse matrix operations).

The architecture of the model 200 can assign the responsibility to learn the weight(s) to matrix W, and the responsibility to learn the representation of skill(s) to the S matrix. This design may allow for leveraging the expert-labeled interaction skill mapping structure. Expert assigned related skills, or other attributes, for each test item can be initialized in the initial matrixes. These skills, or other attributes, can be in test item data store 114.

To leverage the expert labeled question item-skill mapping, the mapping matrix W can be initialized using the expert assigned tags, labels, or metadata. Initialization can be a random initialization. For example, if for each learner interaction $x_i$ in X, a respective question item $q_i$ is tagged with a skill tag array $s_j$, the interaction-skill mapping matrix W can be initialized using the skill tag $s_j$. When $x_i$ is tagged with skill tag $s_j$, the $i_{th}$ row and $j_{th}$ column of skills of interaction-skill mapping matrix W can be initialized to $$\frac{(1 - \text{smoothing})}{\text{temperature}}.$$

Every other skill in the $i_{th}$ row can be initialized to $$\frac{(1 - \text{smoothing})}{(nskills - 1) * (\text{temperature})}.$$

For this example, $c_i=0$ or 1, and can represent whether the response is incorrect or correct. $W_i$ is the $i_{th}$ row of interaction-skill mapping matrix W, representing the weight associated with all latent skills the interaction $x_i$. Further, embedding matrix $e_i$ can be a function of normalized interaction-skill mapping matrix W. The embedding $e_i$ for the interaction can be the product of the normalized $W_i$ and the skill embedding matrix S. For example, $e_i$ can be $e_i$=softmax($W_i$) S. smoothing and temperature can be hyperparameters that control the smoothness of logits passed to the softmax function, and nskills corresponds to the number of skills. In embodiments, smoothing can be set to 0.15, temperature set to 0.1, 0.5, 0.6, 0.7 and/or 0.8.

The weights inside the Interaction Embedding Layer 210 can be:

$$e_{j0} = softmax(W_{j0})S$$
$$e_{j1} = softmax(W_{j1})S$$
$$p_j = \frac{\exp(h_j e_{j1})}{\exp(h_j e_{j0}) + \exp(h_j e_{j1})}$$
$$\text{Loss} = -\sum_j c_j \log(p_j) + (1 - c_j)\log(1 - p_j)$$

Decoder

The model can then co-process the shifted embedding sequence $(e_0, e_1, \ldots, e_{i-1})$ with a shifted interaction time sequence for $t_i$, $(t_0, t_i, \ldots, t_{i-1})$. The transformer block 220 can learn the context-dependent representation of each interaction. The context of interaction, $x_i$ can have two parts: 1) all previous interactions (e.g., $x_0, x_1, \ldots, x_{i-1}$), and 2) all prior interactions respective timestamps $(t_0, t_1, \ldots, t_{i-1})$. Prior interaction timestamps $(t_0, t_1, \ldots, t_{i-1})$ can be measure as a time since $t_0$, or the time of interaction $x_0$. For example, a contextualized array for user interactions can include $x_i=(q_i, c_i, t_i,)$, where $t_i$, corresponds to a timestamp for the interaction. The shifted embedding sequence for $e_i$ and the shifted interaction time sequence for $t_i$ can be co-processed by one or more transformer blocks 220a. The one or more transformer blocks 220a can learn a hidden presentation sequence $h_i$. Although one layer of transformer block 220a is shown for the encoder 205 portion, it can be assumed the model 200 can include one or more of each type of layers or block of layers (e.g. many parallel and/or serial transformer block 220a).

On the decoder 207 side, the $h_i$ sequence from the encoder 205, an embedded questions sequence $e_{i+1}$, and the question time sequence, $t_{i+1}$, can be jointly processed by one or more other transformer blocks 220b to generate decoder hidden representations $h^*_{i+1}$ (e.g. sequence $(h^*_0, h^*_1, \ldots, h^*_n)$).

The decoder outputs can pass through linear layer 230 to generate predicted correct possibility sequence. An input to at least the linear layer 230 can be the next question item. The predicted correct possibility sequence can be a sequence of correctness estimates, $c_{i+1}$, representing whether a student correctly solved the next question $q_{i+1}$. The decoder output can be $x_{j+1} = (q_{i+1}, c_{i+1})$ representing a prediction of whether a student would correctly solve the next question $q_{i+1}$.

The predicted correct possibility sequence can be compared with observed target correctness values, $q_{i+1}$ e.g. by the system 100 receiving a next result of an interaction) to calculate the loss value.

When calculating the loss, $q_i$ can be encoded as $q_{j0} = (q_j, 0)$ and $q_{j1} = (q_j, 1)$ to utilize the weights inside the Interaction Embedding Layer 210. The weights inside the Interaction Embedding Layer can be:

$$e_{j0} = \text{softmax}(W_{j0})S$$
$$e_{j1} = \text{softmax}(W_{j1})S$$
$$p_j = \frac{\exp(h_j e_{j1})}{\exp(h_j e_{j0}) + \exp(h_j e_{j1})}$$
$$\text{Loss} = -\sum_j c_j \log(p_j) + (1-c_j)\log(1-p_j)$$

Transformer Block

Figure 2B:
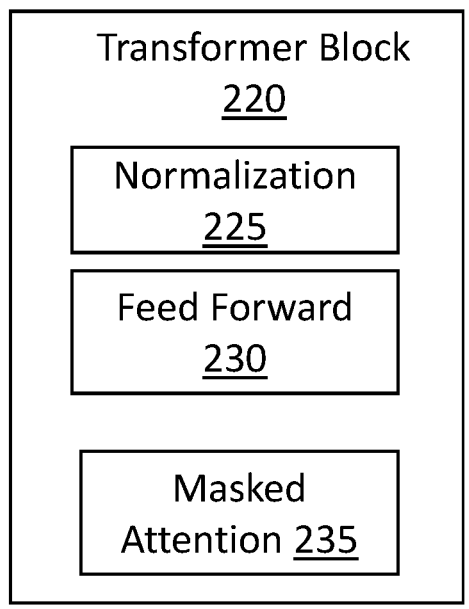
FIG. 2B illustrates a diagram of a transformer block for machine learning based knowledge tracing engine.

FIG. 2B shows example layers of transformer block 220a, 22b. Transformer block 220 can be a block of layers. Transformer block 220 can include one or more feed forward layer 230, normalization layer 225, and/or one or more masked attention layer 235.

The feed forward layer 230 can apply a transformation, such that, for example:

$$F(h_i) = \max(0, h_i W_1 + b_1) W_2 + b_2$$

The normalization layer 225 can apply normalization across the feature dimension, such that, for example:
$N(h_i) = (h_i - \mu(h_i))/\sigma(h_i)$ There can be one or more residual connection wrapping the masked attention layer 235 and the feedforward layer 230 belonging to the same or different transformer blocks 220a, 220b, thus creating a residual connection. The residual connection can be:

$$y = x + \text{layer}\left(\frac{x - \mu(x)}{\sigma(x)}\right).$$

Masked Attention Layer

Now drawing attention to the specifics of the masker attention layer 235, the masked attention layer 235 can address a decay of mastery of one or more skills. While the model predicts a learner's performance on a future test item, problem step, or question item, the transformer block 220a, 220b pays attention to the entire prior history of performance. The masked attention layer 235 can take into consideration some or all combinations of all of the data point in the interaction sequence. Thus the model 200 can keep track of how one interaction is related to every and/or any other interaction.

The system 100 can obtain a time stamp for each learner interaction in the array for learner interactions X. The system 100 can calculate, by the masked attention layer 235, for the most recent learner interaction (or any other learner interaction) and one other learner interaction (other than the first learner interaction), an attention weight based on: i) a time gap between the pair of learner interactions, and/or ii) an overlap of latent skills between corresponding question items (i.e. question items corresponding to learner interactions) for the learner interactions. For example, the attention weight can be higher when the two corresponding question items have a first overlap in latent skills, than when the two corresponding question items have a second overlap in latent skills smaller than the first overlap. As another example, the attention weight can be higher when the two corresponding question items have the same first overlap in latent skills, but a smaller time gap. As another example, the attention weight between the first learner interaction and the other learner interaction can be higher when the interactions have a large overlap in latent skills, than when the two interactions have little overlap in latent skills, or when the two interactions have the same overlap in latent skills and the time gap between the two learner interactions is larger.

Time bias (in general) can assign a higher value to temporally closer (or closer in a time-skill, or other feature space) interactions than temporally distant (or distant in a time-skill, or other feature space) interactions. Further, the query-key agreement can assign a higher value to similar skill interactions. Also, the time bias can adjust the attention, so that temporally distant, but same skill events (i.e. interactions) are assigned lower attention than temporally closer (or closer in a feature space) same-skill events.

Time bias, $b(\Delta t_{j-i})$ can be used to adjust an attention weight, $A_{ij}$ between interactions $e_j$ and $e_i$. Time bias can provide time information to the Masked Attention Layer 235. Time delta (e.g. extracted from time series, or otherwise provided) can be transformed before fitting to the model. Time delta can be provided as an input to the transformer block 220b. The time bias term can model the forgetting behavior such that the attention magnitude between interactions $x_i$ and $x_j$ will be adjusted by their distance in time, with negative exponential decaying.

$b(\Delta t_{j-i}) = uK^*(f(g(\Delta t_{j-i})))$ can represent the time gap between inputs $x_i$ and $x_j$. $g(\ )$ can be a negative exponential function. $g(x)$ can be a negative exponential function, such that $g(x) = e^{-\lambda x}$. $g(x) = e^{-\lambda x}$ can be used to model a human learner's forgetting behavior. $f(x)$ can be a sinusoidal or substantially sinusoidal positional (or temporal) embedding function. $u$ can be the learned vector. $\sqrt{d_k}$ can normalize a magnitude of the attention. $K^*$ can be a trainable key matrix derived from the trainable vector K by applying the transformer model.

The system 100 can be configured to extract, by the masked attention layer 235, query $q_j$ corresponding to a first latent skill for static representation of interaction $e_j$, key $k_j$ corresponding to a second latent skill associated with the static representation of interaction $e_j$, and value $v_j$ corresponding to the state of the latent skill associated with the static representation of interaction $e_j$. Q, K, and V can be trainable vectors. Further, it can be $q_j = Qe_j$, $k_j = Ke_j$, $v_j = Ve_j$.

Attention weight $A_{ij}$ can be proportional to $q_j k_i + b(\Delta t_{j-i}) \cdot q_j k_i$ can be the query-key agreement between interactions $e_j$ and $e_i$. The query-key agreement between interactions $e_j$ and $e_i$ can correspond to the degree of latent skills overlapping between interactions $e_j$ and $e_i$. For example, if two question items have a large overlap in latent skills and one is immediately followed the other (e.g. time gap is small), attention weight value between the two interactions can be high. Alternatively, if two interactions have little overlap in latent skills or are too far apart temporally, the attention weight value can be low. For attention weight $A_{ij}$, it can be:

$$A_{ij} = \frac{q_j k_i + b(\Delta t_{j-i})}{\sqrt{d_k}}.$$

The attention weight used in transformer block 220b can be based on the similarity between the future and past question item. The attention weight between question items can decay as a learner works on successive problems, including problems with same or different overlapping skills, which can effectively represent forgetting behavior of a learner.

The system 100 can be configured to generate a contextualized representation $h_j$ which is a weighted sum product of normalized attention weights times value $v_i$. The contextualized representation $h_j$ can be:

$$h_j = \Sigma_{i \leq j} \text{softmax}(A_{ij}) v_i.$$

The contextualized representation $h_i$ can be proportional to the normalized attention weight(s). Since one goal is to predict correctness value for the next question, $c_{j+1}$, a mask can be forced onto the attention values so that only $A_{ij}$ where $i \leq j$, can be used for calculating $h_j$. Softmax$(A_{ij})=0$, for all $k > j$.

Thus the transformer 220a, 220b can transform the static representation of interaction, $e_j$ into the contextualized representation $h_j$ (or sequence $(h_0, h_1, \ldots, h_{j-1})$) and $h^*_j$ (or sequence $(h^*_0, h^*_1, \ldots, h^*_{j-1}) \cdot h^*_j$ can be the output of transformer 220b, while $h_i$ is the output of transformer 220a.

Transformer Prediction

The decoder 207 outputs and/or transformer 220b outputs (i.e. contextualized representations $h^*_j$) can pass through linear layer 230 to generate predicted correct possibility sequence. The predicted correct possibility sequence can be a sequence of correctness estimates, $c_{i+1}$, representing whether a student correctly solved the next question $q_{i+1}$. The decoder output can be $x_{j+1} = (q_{i+1}, c_{i+1})$ representing a prediction of whether a student would correctly solve the next question $q_{i+1}$.

The predicted correct possibility sequence can be compared with observed target correctness values, $c_{i+1}$ (e.g. by the system 100 receiving a next result of an interaction and comparing) to calculate the loss value.

The correct possibility sequence can also be used to determine a learner recommendation, recommended next test item, and/or knowledge mastery for the learner.

The knowledge mastery level can be the running tally of the user's mastery of the specific tested skill, or mastery of a broader domain (i.e. a broad knowledge domain can contain a hierarchy of component skills). The knowledge mastery level can be displayed as a percentage of 100, or a percentage of a total or complete knowledge mastery. The knowledge mastery level can be based on a prediction output provided by the model 200 described herein. The knowledge mastery level can based on a sequence of correctness estimates, $c_{i+1}$ (or a portion thereof, such as a receptive field based on the most recent interactions, such as the two most recent, four most recent, five most recent, the most recent within one day, one week, two weeks, one month, two months, six months, one year, etc.). The knowledge mastery level can be based on a filter output of the sequence of correctness estimates (or portion thereof, such as a receptive field based on the most recent correctness estimates) for example, an average, a convolution output. For example, if the next question item is predicted to not be answered correctly, the system can calculate and/or display a non-perfect or non-complete knowledge mastery level. As another example, the knowledge mastery level can increase a level (e.g. by 5 percent, 10 percent, 15 percent, 20 percent, 25 percent etc.) if a running tally of next item response predictions are (i.e. 2 in a row, three in a row, four in a row, five in a row, etc.) are predicted to show the learner get the answer correct. As another example, the knowledge mastery level can increase a level if a running tally (e.g. three in a row, etc.) of next item response predictions are predicted to show the learner get the answer correct, and the learner does get end up getting the answer correct. As another further example, the expected knowledge mastery level can decrease if the leaner is predicted to get the next answer right, but ends up getting the answer incorrect.

In systems, the decoder is provided the question ID for the next question. Thus, the model does not have to guess what the next question. It only has to learn whether a learner would answer it correct or not. In some systems, the model 200 can select a different question item (or test item), or the same question item or test item based on that prediction. The system 100 selected test item can be a learner recommended test item to present to the learner as a next test item. A test item can be selected such when the question item is provided to the model as a next test item, (i.e. using the same other model inputs), $c_{i+1}=0$ or, $c_{i+1}=1$. The test item can be selected from the test item data store 114. The test item can be selected so that the adaptive learning and/or adaptive testing allows for a progressively more difficult test, testing of the same difficulty, and/or testing of varying difficulty. The test item can be selected such that a specific knowledge mastery is attained. The test item can be selected based on one or more attributes (e.g. skills, challenge level, discriminator level, etc.). The test item can be selected based on a learner provided indication to switch up the test (e.g. to master a new skill, or for a different level of difficulty). The test item can be selected so that the learner is challenged e.g. the learner will be predicted to not answer the question correctly. The test item can be selected so that the learner is performing at a constant pace e.g. the next question item is selected so that for next question item, the learner is predicted to have a result corresponding to a running average (or another applied filter) of some or all of the previous correctness estimates. Alternatively, the next question item can be selected so that for next question item, the learner is predicted to have a result corresponding to a running average (or another applied filter) of some or all of the previous correctness estimates, which have been proven correctly predicted by the system 100. The next test item to be presented (and applied to the model 200 for verification of the next test item rule) can be selected from the test item data store 114. The next test item can be selected as a test item which has not been previously presented to the learner (e.g. by cross-referencing with a question or test item id in question sequence $q_i$). The next test item can be selected as a test item which been previously presented to the learner but previously answered incorrectly by the learner.

In using model 200 for knowledge tracing (tracking learner's skill acquisition), the model 200 has performed with an Area Under ROC Curve (AUC) of 0.806, Root Mean Square Error (RMSE) 0.414, and Accuracy of 0.743 for a first data set corresponding to ASSISTments 2017. ASSISTments 2017 dataset tracks middle and high school student's usage of the ASSISTments online tutoring system and includes 1,709 students, 942,816 interactions, 4,117 questions and 102 labeled skills.

The ASSISTments 2017 dataset is obtainable at: <https://sites.google.com/view/assistmentsdatamining>.

Further, for a second data set, STAT F2011, AUC was 0.947, RMSE 0.170, and Accuracy was 0.964. STAT F2011 data tracks student scores in a college-level engineering statics course. The data contains 333 students, 189,620 interactions, 1,224 questions, and 81 labeled knowledge components. The STAT F2011 data can be obtained at <https://pslcdatashop.web.cmu.edu/DatasetInfo?datasetId=507>.

For a third data set modified from the challenge set A—Algebra I 2008-2009 data set from the KDD 2010 Educational Data Mining Challenge, AUC was 0.784, RMSE was 0.347, and Accuracy was 0.838. The full data set can be obtained from website https://pslcdatashop.web.cmu.edu/KDDCup/. The full data set contains interactions from 3,310 students, and the applied dataset was modified so that the selected interactions were those with knowledge components.

Figure 3:
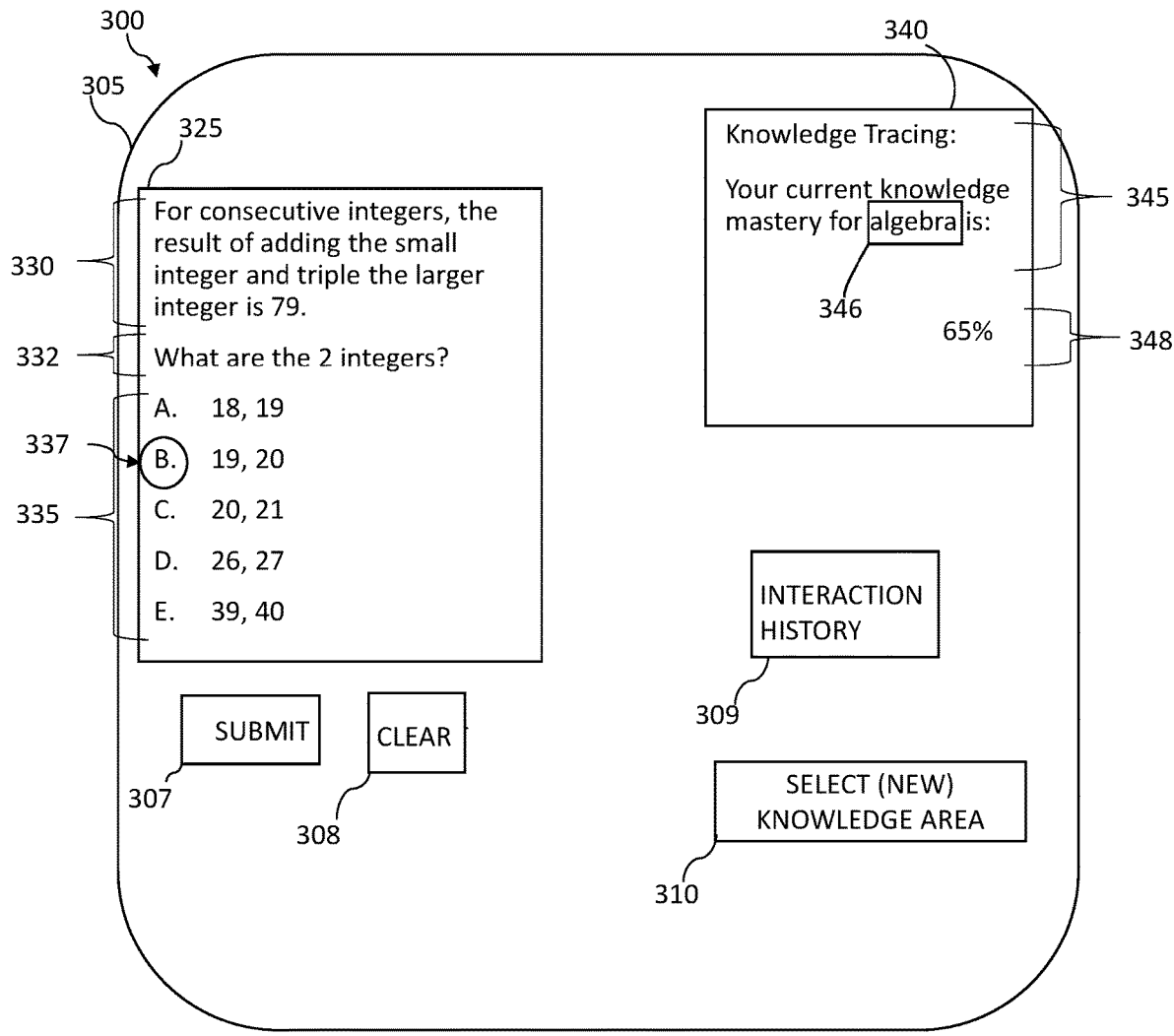
FIG. 3 illustrates an example learner graphical user interface (GUI) for digital knowledge tracing in accordance with embodiments disclosed herein.

FIG. 3 shows a device 300 which includes a GUI 305 with example test item for knowledge tracing and rendering of test item for knowledge tracing. Device 300 can be part of system 100 or be a remote device.

GUI 305 can be at least a part of an interface of a digital tutoring system, digital learning platform, and/or adaptive testing platform. The GUI may be rendered on an electronic device 160 of the system 100, such as the learner interface 138 of device 160. Test items, or portions thereof, can be input into a first portion 325 of the GUI 305. The system 100 can receive and/or render the test item, or portion thereof, in the first portion 325 of the GUI via test module 140. The rendered test item can be a test developer developed test item, and/or a system 100 generated and/or retrieved test item, or a test item from some other source. For example, the test item may be selected by a tutoring program developer or by the system 100, from the test item data store 114, or from another network 134 connected device 160. At least a portion of the test item may be rendered (e.g. displayed) into the first portion of the GUI 325. Displayed or rendered test item can include the passage item 330, the question (or stem) item 332, and/or the answer item 335. Displayed annotations to the rendered test item can include highlighting of the test item (such as annotation of i) relevant key words to draw a learner's attention to those key words, and/or ii) indications 337 of the selected and/or correct answer). Device 160 can also include audio or audible rendering of the test item, for example, utilizing text to speech.

The GUI 305 can include interactive portions for receiving indications. Portions for receiving and/or rendering indications, can include portions for: an indication for a request to log into the system, an indication to contact a tutor, an indication to request a hint, an indication to review learning material associated with the test item, an indication to switch learner or user profile, an indication to submit 307 a selected answer, an indication to clear 308 any of the rendered user or learner selections, an indication to upload a stored learner or user profile, and/or an indication to view or review the learner's interaction history 309. Other received and/or generated indications can include: an indication to select a new or existing knowledge area 310 or concept for testing and/or tutoring, an indication to render and/or generate at least one knowledge mastery level for the learner, an indication to render and/or generate a learning plan for the learner, and/or an indication to generate and/or display attributes and/or metadata associated with the test item (such as skills, question difficulty, a question discriminator level, etc.). The system can also allow for indication from the learner to switch up the test (e.g. to master a new skill, or for a different level of difficulty). Interactive portions can be triggers for the system 100 and can be facilitated by the trigger module 140.

As an example, a learner may login to the system 100 and select a knowledge area 310 for testing. In response to such indications, the system 100 select can select one or more test item from the test item data store 114 based on one or more prior learner interactions with the system 100. If there are no prior interactions, the system 100 can select a pre-selected, a random, and/or an attribute based selected test item (e.g. a first test item can be selected based on skill and/or complexity level). The system can also receive a second indication at the GUI for providing for display a second test item, and the system can provide for display a second test item.

If it is the learner's first interaction with the system 100, the system can select the test item based on one or more attributes, such as the associated skill and/or question difficulty. If the system has prior interactions with the system 100, the system 100 can select the test item for display which is appropriate for the learner's knowledge concept acquisition, or based on a history of learner interactions. The history of one or more learner interactions can be in interaction data store 112. The system can provide the selected test item for display in the first portion of the GUI 325.

The learner can then select or input an answer to the GUI 305. The learner can then provide an indication to submit 307 the answer to the system 100. The system 100 can parse, save, upload the learner's interaction response. The interaction response can be based on the answer selection provided by the learner. The system 100 can score the learner's response, compare the learner's response to a rubric, or other correct answer for the test item. The system 100 can store one or more data for the learner's interaction, such as a time stamp, the time spent answering the question, whether the system correctly predicted if the learner would answer the question correctly, or not, if the submitted learner response was correct or not, etc. The system can apply NLP engine 108 and/or machine learning engine 109, to score the learner response, and/or provide the response for manual scoring (e.g. by the printer 165 or by sending to a remote device 160). The system 100 can select another test item for display based on the user's interaction with the system and the one or more data based on that interaction. The system 100 can select another test item for display based on the transformer based model 200 as described herein.

In the first portion 325 or a second portion 340 of the GUI 305, a prompt 345 can show one or more skill 346 (or other attribute) related to the test item being tested. An individualized suggestion, feedback, and/or prompt based on a learner's individualized sequence of learner interactions and/or knowledge mastery level can also be displayed. This individualized feedback can be based on predictions generated by the transformer based model 200 described herein. For example, an adapted timeline (e.g. number of questions left to answer before achieving a perfect or other knowledge mastery level) can be shown. A knowledge mastery level 348 can also be presented.

Figure 4:
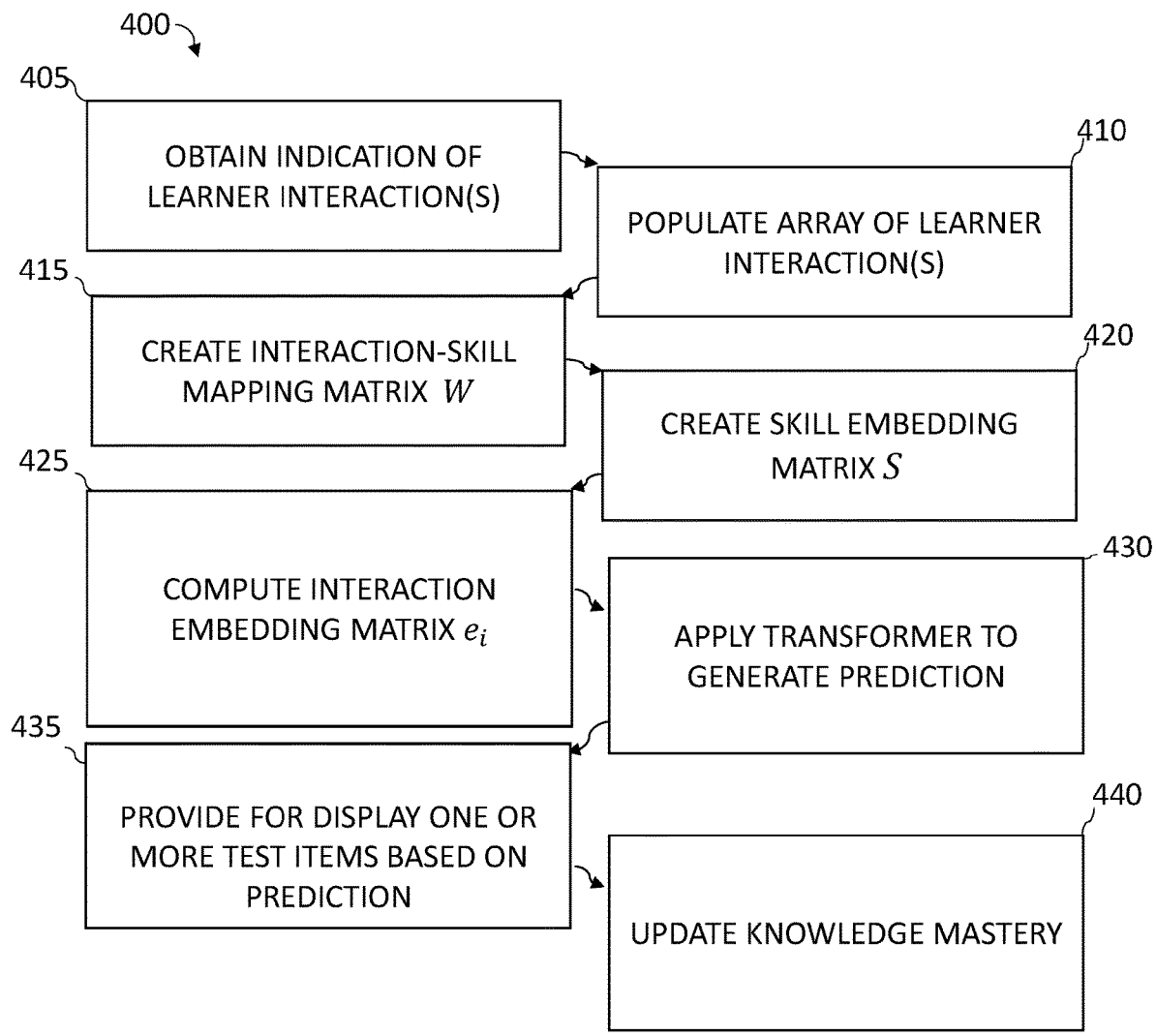
FIG. 4 illustrates a method for digital knowledge tracing with machine learning based knowledge tracing engine as described herein.

FIG. 4 illustrates a method 400 for digital knowledge tracing with machine learning based knowledge tracing engine as described herein. The method 400 can include step 405 for obtaining an indication of at least one learner interaction. The indication can include one or more composite indications. The indication can be in interaction data store 112. The indication can be receipt of a first learner interaction, for example, in the form a learner submitting 307 a result of a user interaction (e.g. an attempt to answer a test item question). The method 400 can include step 410 for populating array of learner interactions. The array of learner interactions can be array for learner interactions, X. The array for learner interactions can include sequence tuples $x_i=(q_i, c_i)$. For example, $q_i$ can represent a question item (or test item) the learner attempted to answer or a problem the learner was trying to solve. $c_i$ can represent whether the corresponding response was incorrect or correct in the interaction. The array for user interactions can include $x_i=(q_i, c_i, t_i,)$, where $t_i$ corresponds to a timestamp for the interaction. The method 400 can be to produce a sequence of correctness estimates, $c_{i+1}$, representing whether a student correctly solved the next question $q_{i+1}$.

The method 400 can include step 410 for creating interaction-skill mapping matrix. Interaction-skill mapping reference can be matrix W described with reference to interaction embedding layer 210 of FIG. 2A. The method 400 can further include step 420 for creating skill embedding matrix. Skill embedding matrix can be matrix S described with reference to interaction embedding layer 210 of FIG. 2A. Method 400 can include step 425 for computing an interaction embedding matrix for the learner interactions. The interaction embedding matrix can be interaction embedding matrix $e_i$ described with reference to interaction embedding layer 210 of FIG. 2A.

The method 400 can further include step 430 of applying a transformer to generate a prediction. Transformer can be one or more transformer 220a, 220b as described with reference to FIG. 2A and FIG. 2B. Prediction can be $x_{i+1}=(q_{i+1}, c_{i+1})$ representing a prediction for a next interaction (question, and/or result of interaction). The prediction can be a prediction of whether a student correctly solved the next question $q_{i+1}$. The prediction can be a predicted correct possibility sequence, and/or can be a sequence of correctness estimates, $c_{i+1}$, representing whether a student correctly solved the next question $q_{i+1}$. The prediction can be $x_{j+1}=(q_{i+1}, c_{i+1})$ representing a prediction of whether a student would correctly solve the next question $q_{i+1}$. The prediction can be probability for next interaction result $c_{i+1}$ as described herein.

The method 400 can include step 435 for providing for display one or more test items based on the prediction, and/or providing a learner recommendation based on the prediction. The system can render for display one or more attributes from the test item data store 114 as described with reference to FIG. 1B. A test item can be rendered for display as shown in FIG. 3.

Method 400 can include step 440 for updating a knowledge mastery. The updated knowledge mastery can be a knowledge mastery level. The knowledge mastery level can be generated and/or provided for display 348 as shown in FIG. 3. The knowledge mastery level can be updated upon receipt of an interaction based on the most recent test item provided for display. The knowledge mastery level can be updated upon receipt of a learner interaction based on the test item provided for display at step 435. The knowledge mastery level can be updated upon calculation of sequence of correctness estimates, $c_{i+1}$ and/or correctness probability. The method 400 can further include updating a question (and answer) to skill mapping (e.g. W) as described herein.

Method 400 can further include receiving a learner interaction result based on the test item provided for display at step 435. The method 400 can further include updating one or more weights and/or biases of the model 200. The model 200 can be updated based on a comparison of the received learner interaction result and a predicted learner interaction result.

Figure 5:
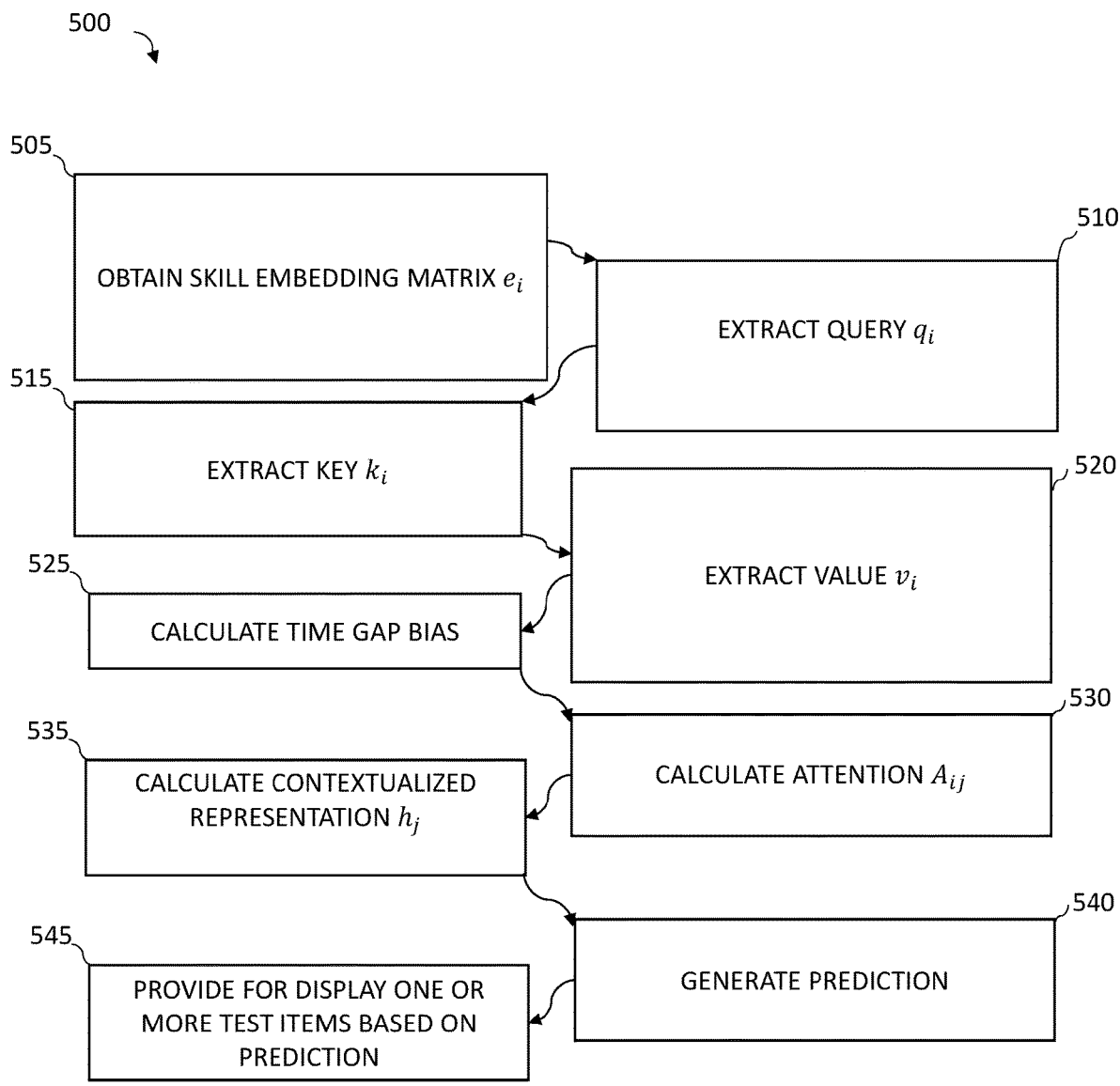
FIG. 5 illustrates a method for digital knowledge tracing with machine learning based knowledge tracing engine as described herein.

FIG. 5 illustrates a method 500 for digital knowledge tracing with machine learning based knowledge tracing engine as described herein. Method 500, as compared to method 400, provides more detailed steps for generating a prediction by a transformer. Method 500 can include step 505 for obtaining skill embedding matrix $e_i$. Skill embedding matrix $e_i$ can be obtained from one or more interaction embedding layer 210 of model 200 as described with reference to FIG. 2A. Method 500 can include step 510 for extracting query $q_i$. Method 500 can include step 515 for extracting key $k_i$. Method 500 can include step 520 for extracting value $v_i$. Method 500 can include step for calculating a time gap bias 525. Method 500 can further include step 530 for calculating an attention $A_{ij}$. Attention $A_{ij}$ can at least be based on the time gap bias. Method 500 can include step 535 for calculating a contextualized representation $h_j$ for the interactions (e.g. as described herein). The contextualized representation $h_j$ can at least be based on the attention $A_{ij}$ as described herein. Steps 505 to steps 535 can be performed by the transformer block 220, and/or the masked attention layer 235 with reference to FIG. 2A and FIG. 2B. Method 500 can include step 540 for applying transformer 220 to generate a prediction. Step 540 can include applying transformer 220b to embedding matrix $e_i$ in view of the time gap biases and contextualized representation $h_j$ to generate a second contextualized representation $h^*_j$. The second contextualized representation $h^*_j$ can be passed through a linear layer 230 to determine $c_{i+1}$ (which can represent a prediction of whether a student can correctly solve the next question $q_{i+1}$). The prediction can be a prediction and/or probability for next interaction result $c_{i+1}$ as described herein. Method 500 can include step 535 for providing for display one or more test items based on the prediction. The one or more test items can be a learner recommended next test item. Method 500 can also include step for providing for display one or more knowledge mastery levels, and/or one or more learner recommendation which can be determined as described herein.

The invention claimed is:
1. A digital learning system, comprising:
   a graphical user interface (GUI); and
   a machine learning based knowledge tracing engine, wherein the machine learning based knowledge tracing engine comprises:
      a processor; and
      a non-transitory medium with computer executable instructions embedded thereon, the computer executable instructions configured to cause the processor to:
         provide for display at the GUI a first question item;
         obtain, by the GUI, an indication of a first learner interaction with the first question item;
         populate an array for learner interactions X with an element comprising the first question item and the first learner interaction;
         map, by an interaction embedding layer operating on the machine learning based knowledge tracing engine, the array for learner interactions into an embedding $e_i$ for the interactions, by:

creating an interaction-skill mapping matrix W, which represents a weight associated with all latent skills for the learner interactions, and creating a skill embedding matrix S which represents the latent skills for each learner interaction, wherein X comprises elements $x_i=(q_i, c_i)$, $q_i$ represents the first question item or another question item, and $c_i$ represents whether the corresponding response was incorrect or correct in the interaction; and provide for display at the GUI a second question item selected based on the embedding $e_i$ for the interactions, the second question item corresponding to a recommended learner recommendation.

2. The system of claim 1, wherein $W_i$ is the $i_{th}$ row of interaction-skill mapping matrix W, representing the weight associated with all latent skills the interaction $x_i$, and wherein each column of skill embedding matrix S is a vector representation of one of the latent skills of the interaction $x_i$.

3. The system of claim 2, wherein $W_i$ is the $i_{th}$ row of interaction-skill mapping matrix W, representing the weight associated with all latent skills the interaction Xi; and the embedding $e_i$ for the interaction is the product of the normalized $W_i$ and the skill embedding matrix S.

4. The system of claim 3, wherein $e_i$=softmax($W_i$)S.

5. The system of claim 1, wherein for each learner interaction $x_i$ in X, a respective question item $q_i$ is tagged with a skill tag array $s_j$, and the interaction-skill mapping matrix W is initialized using the skill tag $s_j$.

6. The system of claim 5, wherein the system is configured, when $x_i$ is tagged with skill tag $s_1$, the $i_{th}$ row and $j_t$h column of skills of interaction-skill mapping matrix W is initialized to $$\frac{(1 - \text{smoothing})}{\text{temperature}},$$

and every other skill in the $i_{th}$ row is initialized to $$\frac{(1 - \text{smoothing})}{(nskills - 1) * (\text{temperature})};$$

wherein:
$c_i$=0 or 1, representing whether the response is incorrect or correct;
$W_i$ is the $i_{th}$ row of interaction-skill mapping matrix W, representing the weight associated with all latent skills the interaction $x_i$;
$e_i$=softmax($W_i$)S; and
smoothing and temperature are hyperparameters that control the smoothness of logits passed to the softmax function.

7. The system of claim 1, wherein the interaction-skill mapping matrix W is initialized using expert assigned skill tags.

8. A digital learning system, comprising:
a graphical user interface (GUI); and
a machine learning based knowledge tracing engine, wherein the machine learning based knowledge tracing engine comprises:

a processor; and
a non-transitory medium with computer executable instructions embedded thereon, the computer executable instructions configured to cause the processor to:
provide for display at the GUI a first question item;
obtain, by the GUI, an indication of a first learner interaction with the first question item;
populate an array for learner interactions X with an element comprising the first question item and the first learner interaction;
map, by an interaction embedding layer operating on the machine learning based knowledge tracing engine, the array for learner interactions into an embedding $e_i$ for the interactions;
provide for display at the GUI a second question item selected based on the embedding $e_i$ for the interactions, the second question item corresponding to a recommended learner recommendation;
operate a transformer comprising a masked attention layer;
obtain a time stamp for each learner interaction in the array for learner interactions X; and
calculate, by the masked attention layer, for the most recent learner interaction and one other learner interaction, an attention weight based on a time gap between the pair of learner interactions and an overlap of latent skills between corresponding question items for the learner interactions.

9. The system of claim 8, wherein the attention weight is higher when the two corresponding question items have a first overlap in latent skills, than when the two corresponding question items have a second overlap in latent skills smaller than the first overlap.

10. A system for generating metadata for test items, comprising:
a graphical user interface (GUI); and
a trained machine learning knowledge tracing engine operating a transformation model comprising a masked attention layer, the trained machine learning knowledge engine comprising:
a processor; and
a non-transitory computer readable medium with computer executable instructions embedded thereon, the computer executable instructions configured to cause the processor to:
provide for display at the GUI a first question item;
obtain, by the GUI, a first learner interaction $x_j$;
update a learner interaction array X with the first learner interaction $x_j$;
embed, by the trained machine learning knowledge tracing engine, the array for learner interactions X into a static representation $e_j$ corresponding to the first learner interaction $x_j$;
calculate, by the masked attention layer, an attention weight $A_{ij}$ based on a time gap between the first learner interaction $x_j$ and another learner interaction in the learner interaction array;
calculate a contextualized interaction representation $h_j$, wherein the contextualized interaction representation $h_j$ is proportional to the attention weight $A_{ij}$; and
provide for display at the GUI a second question item based on the contextualized interaction representation $h_j$, the second question item corresponding to a recommended learner recommendation.

11. The system of claim 10, wherein time bias $b(\Delta t_{j-i})$ is used to adjust the attention weight, $A_{ij}$ between interactions $e_j$ and $e_i$.

12. The system of claim 11, wherein the computer executable instructions configured to cause the processor to:
extract, by the masked attention layer of the transformation model, query $q_j$ corresponding to a first latent skill for static representation of interaction $e_j$, key $k_j$ corresponding to a second latent skill associated with the static representation of interaction $e_j$, and value $v_j$ corresponding to the state of the latent skill associated with the static representation of interaction $e_j$,
such that $q_j = Qe_j$, $k_j = Ke_j$, $v_j = Ve_j$, wherein Q, K, and V are trainable vectors.

13. The system of claim 12, wherein the attention weight $A_{ij}$ is proportional to $q_j k_i + b(\Delta t_{j-i})$ and wherein $q_j k_i$ is a query-key agreement between interactions $e_j$ and $e_i$.

14. The system of claim 13, wherein:
for the attention weight $$A_{ij}, A_{ij} = \frac{q_j k_i + b(\Delta t_{j-i})}{\sqrt{d_k}};$$

$b(\Delta t_{j-i}) = uK^*(f(g(\Delta t_{j-i})))$;
$\Delta t_{j-i} = t_j - t_i$, corresponding to the time gap between inputs $x_j$ and $x_i$;
$g(x)$ is a negative exponential function, such that $g(x) = e^{-\lambda x}$;
$f(x)$ is a sinusoidal positional embedding function;
u is a learned vector;
$\sqrt{d_k}$ normalizes an attention magnitude; and
$K^*$ is a trainable key matrix derived from the trainable vector K by applying the transformer model.

15. The system of claim 14, wherein the contextualized representation $h_j$ is a weighted sum product normalized attention weights times value $v_i$.

16. The system of claim 15, wherein the contextualized representation $h_j$ is:

$$h_j = \Sigma_{i \leq j} \text{softmax}(A_{ij}) v_i.$$

17. A digital learning system, comprising:
a graphical user interface (GUI); and
a machine learning based knowledge tracing engine, wherein the machine learning based knowledge tracing engine comprises:
a processor; and
a non-transitory medium with computer executable instructions embedded thereon, the computer executable instructions configured to cause the processor to:
provide for display at the GUI a first question item;
obtain, by the GUI, an indication of a first learner interaction with the first question item;
populate an array for learner interactions X with an element comprising the first question item and the first learner interaction;
map, by an interaction embedding layer operating on the machine learning based knowledge tracing engine, the array for learner interactions into an embedding $e_i$ for the interactions;
provide for display at the GUI a second question item selected based on the embedding $e_i$ for the interactions, the second question item corresponding to a recommended learner recommendation,
wherein an attention weight is based on an overlap between a first latent skill corresponding to the first learner interaction $x_j$; and a second latent skill corresponding to a second interaction in the learner interaction array X.

18. The system of claim 17, wherein the attention weight between the first learner interaction and the other learner interaction is higher when the interactions have a large overlap in latent skills, than when the two interactions have little overlap in latent skills, or when the two interactions have the same overlap in latent skills and the time gap between the two learner interactions is larger.

19. A digital learning system, comprising:
a graphical user interface (GUI); and
a machine learning based knowledge tracing engine, wherein the machine learning based knowledge tracing engine comprises:
a processor; and
a non-transitory medium with computer executable instructions embedded thereon, the computer executable instructions configured to cause the processor to:
provide for display at the GUI a first question item;
obtain, by the GUI, an indication of a first learner interaction with the first question item;
populate an array for learner interactions X with an element comprising the first question item and the first learner interaction;
map, by an interaction embedding layer operating on the machine learning based knowledge tracing engine, the array for learner interactions into an embedding $e_i$ for the interactions;
provide for display at the GUI a second question item selected based on the embedding $e_i$ for the interactions, the second question item corresponding to a recommended learner recommendation,
wherein the machine learning knowledge tracing engine operates the interaction embedding layer, and wherein embedding by the transformation model, the each learner interaction $x_i$ in the array for learner interactions X into a static representation $e_j$ includes: mapping, by the machine learning knowledge tracing engine, the array for learner interactions X into the static representation $e_i$ for the interactions.

* * * * *